United States Patent Office 3,636,032
Patented Jan. 18, 1972

3,636,032
INDANE DERIVATIVES OF THIOCARBAMIC ACIDS
Hermann Breuer, Regensburg, Germany, assignor to E. R. Squibb & Sons, Inc., New York, N.Y.
No Drawing. Filed Aug. 6, 1968, Ser. No. 750,486
Int. Cl. C07c 155/08
U.S. Cl. 260—455 A — 3 Claims

ABSTRACT OF THE DISCLOSURE

This invention relates to new indane derivatives of substituted thiocarbamic acids, more particularly, those having the formula

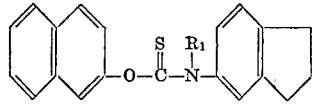

wherein $R_1$ is hydrogen or lower alkyl. These new compounds are useful as antifungal agents.

SUMMARY OF THE INVENTION

This invention relates to new indane derivatives of substituted thiocarbamic acids which have the general formula (I)
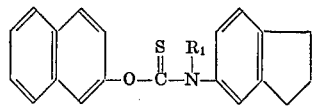

wherein $R_1$ is hydrogen or lower alkyl.

The lower alkyl groups may be straigth or branched chain, e.g., methyl, ethyl, propyl, isopropyl, butyl, isobutyl, t-butyl or the like.

The compounds of this invention may be produced by conventional reactions of condensing a thionocarbonic acid ester chloride of the general formula (II)
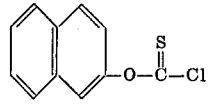

with an amine of the general formula (III)
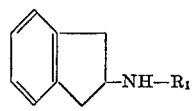

in the presence of an acid binding agent. Alternatively, a thionocarbamic acid chloride of the general formula (IV)
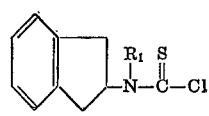

will react with a phenol of the formula (V)
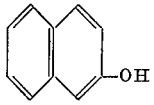

The symbols have the same meaning as above.

The new compounds of this invention are fungistatic agents useful against Dermatophytes such as *Trichophyton mentagrophytes* and may be applied topically to the skin surface of an affected animal species such as mice, guinea pigs or the like in conventional vehicles such as creams, ointments or lotions at a concentration of about 0.1 to 3% (by weight).

The following example is illustrative of the invention.

EXAMPLE 16.6 grams of chlorothioformic acid-0,2-naphthyl ester are dissolved in 90 ml. of acetone, 12.4 grams of sodium bicarbonate are added and 11 grams of 5-methylaminoindane are added dropwise with stirring at about 20° C. 200 ml. of water are then added and the crystals which separate are filtered under suction. The yield is 21.8 grams of N-methylthio-5-indanecarbamic acid-0-2-naphthyl ester, M.P., 139–140° C. After recrystallization from dioxane the substance melts at 145–146° C.

What is claimed is:
1. A compound of the formula

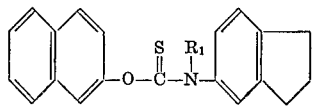

wherein $R_1$ is hydrogen or lower alkyl.
2. A compound as in claim 1 wherein $R_1$ is lower alkyl.
3. A compound as in claim 1 wherein $R_1$ is methyl.

References Cited

UNITED STATES PATENTS

| | | | |
|---|---|---|---|
| 2,994,710 | 8/1961 | Morales | 260—455 |
| 3,084,096 | 4/1963 | Lambrech | 424—300 |
| 3,334,126 | 8/1967 | Miyazaki et al. | 424—300 |
| 3,352,815 | 11/1967 | Bencze | 260—455 |
| 3,450,745 | 6/1969 | Payne Jr., et al. | 260—455 |
| 3,509,200 | 4/1970 | Elpern et al. | 260—455 |

OTHER REFERENCES

Teruhisa et al., "Selective Toxicity," III. Some consideration of anti-trichophyton activity of 2-naphthyl N-methyl-N-arylthiocarbamates (1968), CA 69 No. 93987q, 1968.

LEWIS GOTTS, Primary Examiner
G. HOLLRAH, Assistant Examiner

U.S. Cl. X.R.
424—300